United States Patent [19]

Ikemoto et al.

[11] Patent Number: 4,503,957
[45] Date of Patent: Mar. 12, 1985

[54] SHIFT MECHANISM IN A MANUAL TRANSMISSION

[75] Inventors: Kazuhito Ikemoto; Yukio Terakura; Takashi Miyake, all of Toyota, Japan

[73] Assignee: Toyota Jidosha Kabushiki Kaisha, Aichi, Japan

[21] Appl. No.: 468,367

[22] Filed: Feb. 22, 1983

[30] Foreign Application Priority Data

Mar. 9, 1982 [JP] Japan .................................. 57-37842

[51] Int. Cl.³ .......................................... B60K 41/26
[52] U.S. Cl. ................... 192/4 C; 192/4 A; 74/411.5; 74/339
[58] Field of Search ............ 74/411.5, 339; 192/4 C, 192/53 F, 4 A

[56] References Cited

U.S. PATENT DOCUMENTS

| 4,089,394 | 5/1978 | Haupt et al. ...................... 192/4 A |
| 4,192,410 | 3/1980 | Poirier ........................... 192/4 C X |
| 4,221,283 | 9/1980 | Nordkvist et al. ............ 192/4 A X |
| 4,330,053 | 5/1982 | Gesenhaus ......................... 192/4 C |
| 4,332,312 | 6/1982 | Sabel et al. ....................... 192/4 C |
| 4,430,904 | 2/1984 | Fogelberg ...................... 192/4 A X |

FOREIGN PATENT DOCUMENTS 54-98451  8/1979  Japan ................................ 74/411.5

Primary Examiner—Allan D. Herrmann
Assistant Examiner—Arthur T. Quiray
Attorney, Agent, or Firm—Parkhurst & Oliff

[57] ABSTRACT

A shift mechanism in a manual transmission which may reduce an inertial revolution of a counter shaft system by applying to it a dragging resistance or a frictional force before reverse gears are meshed with each other during a reverse shifting operation to prevent a gear buzzing or a body shock, and may permit the reverse shifting operation to be smoothly carried out by releasing the dragging resistance from the counter shaft system upon completion of the reverse shifting operation.

7 Claims, 5 Drawing Figures

SHIFT MECHANISM IN A MANUAL TRANSMISSION

BACKGROUND OF THE INVENTION

This invention relates to a shift mechanism in a manual transmission of such a type that when a reverse idler gear mounted on a reverse idler shaft is shifted by a reverse shifting operation, a clutch hub sleeve of a synchromesh unit for a forward speed gear, which unit is mounted on a counter shaft and is adapted to rotate with the counter shaft, is moved in a reverse direction relative to the forward speed geared position.

A reverse shift mechanism in a manual transmission is generally of a sliding mesh type or a constant mesh type except for some kinds of automobile. Namely, as a reverse shifting operation is carried out under a rest condition of the automobile, a synchromesh mechanism as is used for a forward shift mechanism is not employed for a reverse shift mechanism. However, in the case that the number of revolution of a counter shaft, which revolution is transmitted from an input shaft after releasing a clutch, is large, the number of revolution of meshed gears by a reverse shift operation is relatively large and as a result, a gear buzzing and a body shock sometimes arise to render a driver uncomfortable or to rarely damage gears, which is notable for a sliding mesh type.

The number of revolution of a counter shaft system after releasing a clutch recently tends to become large. This is caused by such reasons that a revolution transmitting efficiency of a transmission at lower temperatures has been improved and a lubricating oil having a low viscosity has been widely employed for the aim of smoother sliding operation, and further an engine idling speed is set to a higher value because of generalization of air conditioner mounting automobiles.

SUMMARY OF THE INVENTION

Accordingly, an object of the present invention is to provide a shift mechanism in a manual transmission which may reduce an inertial revolution of a counter shaft system by applying to it a dragging resistance of a frictional force before reverse gears are meshed with each other during a reverse shifting operation to prevent a gear buzzing or a body shock, and may permit the reverse shifting operation to be smoothly carried out by releasing the dragging resistance from the counter shaft system upon completion of the reverse shifting operation.

According to the present invention, in a manual transmission of such a type that when a reverse idler gear mounted on a reverse idler shaft is shifted by a reverse shifting operation, a clutch hub sleeve of a synchromesh unit for a forward speed gear, which unit is mounted on a counter shaft and is adapted to rotate with the counter shaft, is moved in a reverse direction relative to the forward speed geared position through an annular groove formed on the clutch hub sleeve and a shift fork adapted to engage with the annular groove; a shift mechanism comprises an arm rotatably mounted to said shift fork, one end of said arm being formed as a frictional portion adapted to contact with the bottom surface of said annular groove, a cam surface formed on a predetermined element of a transmission casing and having projection, and means for applying rotational moment to said arm so as to urge the other end of said arm against said cam surface at all times, said arm being rotated to urge said frictional portion against the bottom surface of said annular groove when the other end of said arm passes over said projection of said cam surface during movement of said clutch hub sleeve in a reverse direction relative to the forward speed geared position.

The invention will be more fully understood from the following detailed description and appended claims when taken with the drawings.

DETAILED DESCRIPTION OF THE PREFERRED EMBODIMENTS

Figure 1:
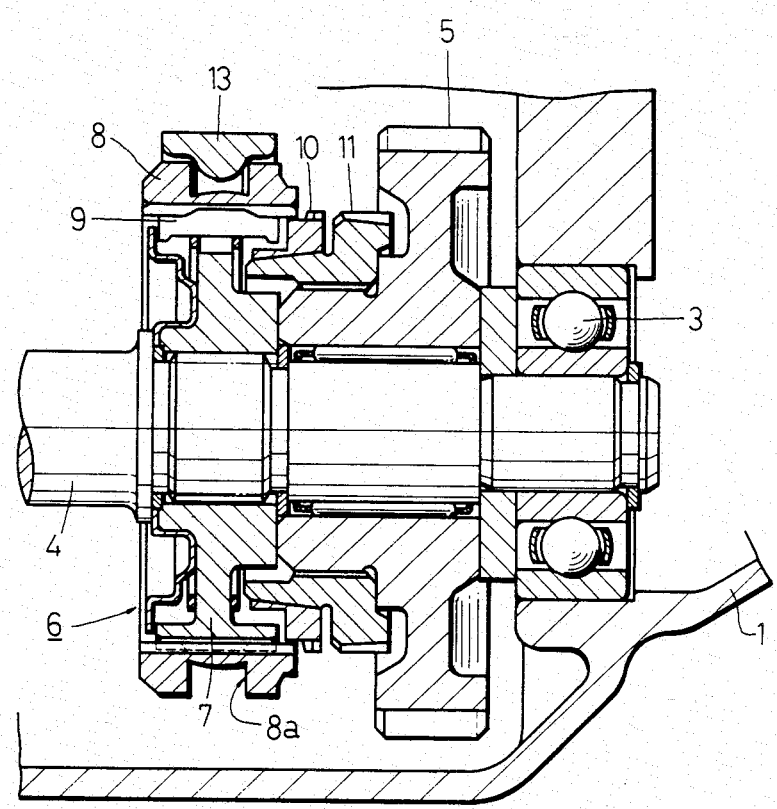
FIG. 1 is a longitudinal sectional view of the shift mechanism for the fifth speed gear in the transmission casing according to the present invention.

Referring now to FIG. 1 showing a part of a manual transmission for an automotive vehicle, reference numeral 1 designates a transmission casing or an extension housing, in which a counter shaft 4 is rotatably supported by a bearing 3. A forward fifth speed gear 5 is freely rotatably mounted on the shaft 4 and is always meshed with a gear mounted on an associated output shaft (not shown). There is provided a synchromesh unit 6 for a fifth speed adjacent to the fifth speed gear 5, which unit 6 being adapted to rotate integrally with the shaft 4 at all times. In other words, a clutch hub 7 constituting the synchromesh unit 6 is fitted on the shaft 4 integrally therewith by spline engagement and the like, and a clutch hub sleeve 8 is engaged with the clutch hub 7 by spline so as to slide axially or in the right-hand and left-hand directions in FIG. 1. When the clutch hub sleeve 8 is slided in the right-hand direction in FIG. 1 by a shifting operation for the fifth speed, a synchronous revolution of the counter shaft 4 and the fifth speed gear 5 is generated by a shifting key 9, a synchronizer ring 10 and an inner spline chamfer of the hub sleeve 8 in the synchromesh unit 6 and then an inner spline of the clutch hub sleeve 8 is meshed with an outer spline 11 of the gear 5, thus completing the shifting operation for the fifth speed.

Figure 2:
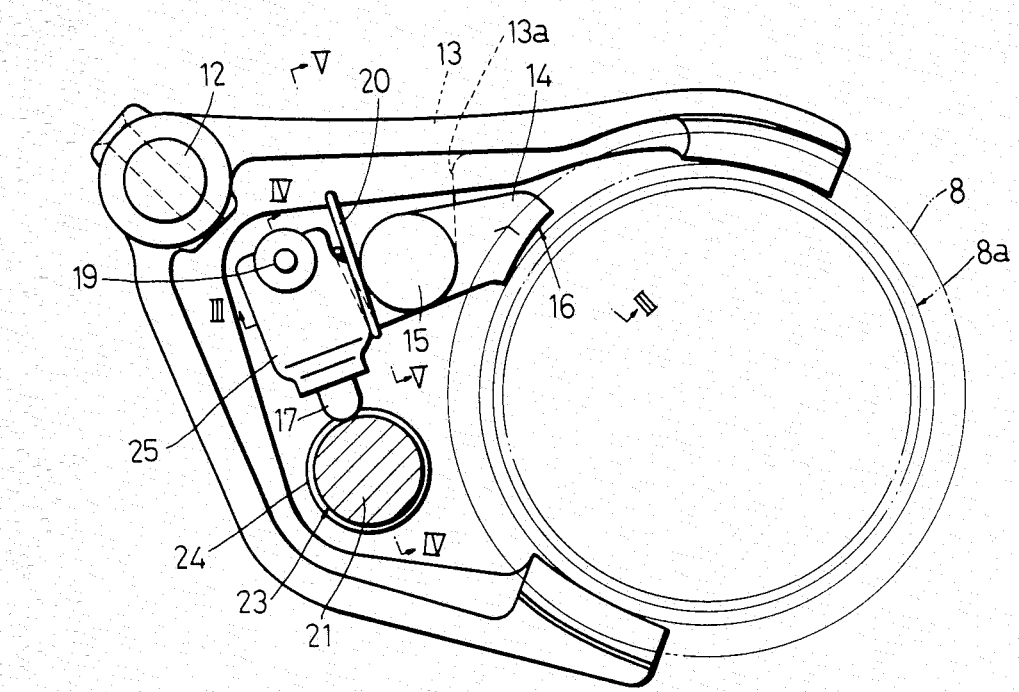
FIG. 2 is a side view of the essential part of FIG. 1.

The shifting operation for the fifth speed as hereinabove mentioned is carried out by shifting a fork shaft 12 and a shift fork 13 mounted on the shaft 12 as shown in FIG. 2. In other words, the free ends of the shift fork 13 are engaged with a circular groove 8a formed on the outer circumference of the clutch hub sleeve 8 for the synchromesh unit 6, thereby sliding the clutch hub sleeve 8.

Figure 3:
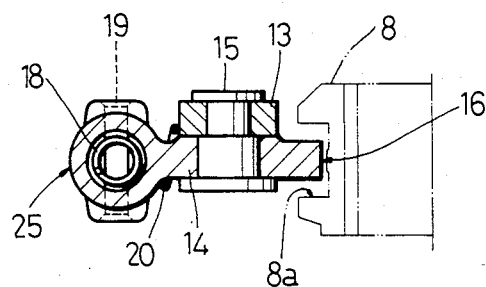
FIG. 3 is a cross-section taken along the line III—III in FIG. 2.

As is apparent from FIG. 3, a substantially intermediate portion of an arm 14 is rotatably supported by a stepped shaft 15 at a projected portion 13a of the shift fork 13 (See FIG. 2). One end of the arm 14 is formed into a frictional portion 16 adapted to contact with the bottom surface of the groove 8a of the clutch hub sleeve 8 and the other end of the arm 14 is formed into a cylindrical holder member 25 includes a pin 17 projecting through the lower portion of the holder member 25 and the coil spring 18. A slotted pin 19 is radially inserted into the upper portion of the holder member 25 for receiving a biasing force of the coil spring 18. As viewed in FIG. 4, the pin 17 is downwardly urged by the coil spring 18 and is kept in the projected position, and the lower end of the pin 17 is so positioned as to bring into contact with a cam surface 23 formed on the outer circumference of a reverse idler shaft 21. As shown in FIG. 5, there is provided a return spring 20 having a small resilient force between the arm 14 and the projected portion 13a of the shift fork 13. The return spring 20 serves to keep the frictional portion 16 of the arm 14 away from the bottom surface of the groove 8a of the clutch hub sleeve 8 and to keep the pin 17 in a slight contact with the cam surface 23. As is generally known in the art, a reverse idler gear 22 is mounted on the reverse idler shaft 21 so as to be slided in the left-hand direction by a reverse shifting operation as viewed in FIG. 4.

Figure 4:
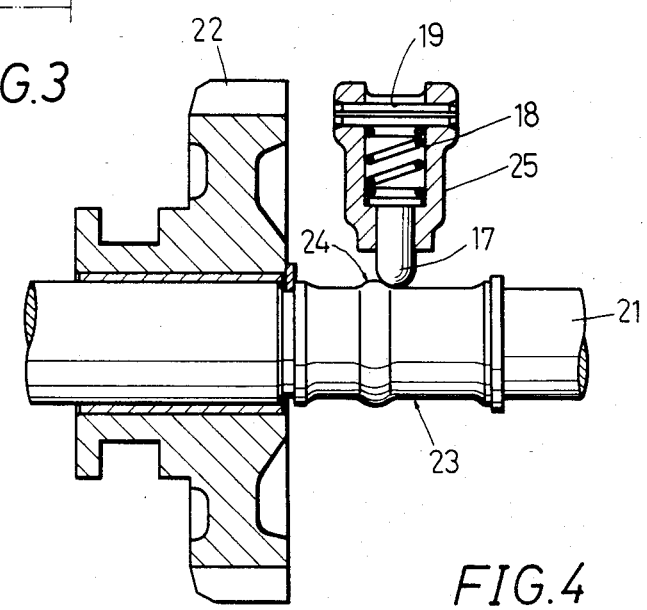
FIG. 4 is a cross-section taken along the line IV—IV in FIG. 2.
Figure 5:
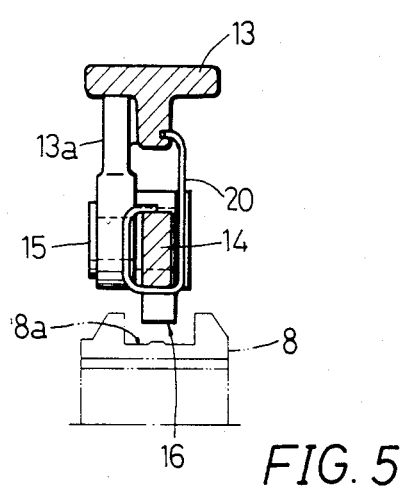
FIG. 5 is a cross-section taken along the line V—V in FIG. 2.

In a reverse shifting operation, when the reverse idler gear 22 is slided in the left-hand direction from the neutral position as shown in FIG. 4, it is synchronously meshed with a reverse gear (not shown) mounted on the counter shaft and another reverse gear (not shown) mounted on the output shaft, thus obtaining a reverse shift position. Being accompanied by the reverse shifting operation, the clutch hub sleeve 8 of the synchromesh unit 6 is shifted through the fork shaft 12 and the shift fork 13 in the left-hand direction as viewed in FIG. 1. In other words, the clutch hub sleeve 8 is moved in a reverse direction relative to the fifth speed geared position. When the shift fork 13 is moved leftwardly as viewed in FIG. 1, the arm 14 is also moved leftwardly and accordingly, the pin 17 accommodated in the holder member 25 of the arm 14 is moved in the left-hand direction from the position as shown in FIG. 4 along the cam surface 23 of the reverse idler shaft 21. On the way of the leftward movement of the pin 17, the free end of the pin 17 lies on an annular projection 24 formed on the cam surface 23, thereby momentarily rotating the arm 14 about the stepped shaft 15 against the resilient force of the return spring 20. As a result, the frictional portion 16 of the arm 14 is strongly urged on the bottom surface of the groove 8a of the clutch hub sleeve 8, and thus a frictional force is created between the clutch hub sleeve 8 rotating with the counter shaft 4 and the frictional portion 16 of the arm 14, thereby greatly reducing an inertial revolution of the counter shaft 4.

Being accompanied by a subsequent reverse shift operation, the arm 14 is moved in a reverse direction relative to the fifth speed geared position, and the pin 17 goes over the annular projection 24 on the cam surface 23 of the idler shaft 21. As a result, the arm 14 is returned to its original position as shown in FIG. 2 by the resilient force of the return spring 20 and the frictional portion 16 is brought into separation from the bottom surface of the groove 8a of the clutch hub sleeve 8, thereby releasing the frictional force or the dragging resistance between the clutch hub sleeve 8 or the counter shaft 4 and the frictional portion 16.

As is hereinabove described, on the way of the reverse shifting stroke, the dragging resistance is momentarily applied to the counter shaft 4 and upon completion of the reverse shifting operation, the dragging resistance is released from the counter shaft 4. Accordingly, before the reverse idler gear 22 is meshed with the reverse gears, the inertial revolution of the counter shaft 4 is reduced, thereby permitting the reverse shift operation to be smoothly carried out.

The cam surface 23 is not necessarily formed on the reverse idler shaft 21. In other words, it may be formed on any elements which are in rest relative to the arm 14 moving in a reverse direction relative to the fifth speed geared position during the reverse shifting operation, for example, on the inside wall of the transmission casing 1.

While the invention has been described with reference to a preferred embodiment thereof, it is to be understood that modifications or variations may be easily made without departing from the scope of this invention which is defined by the appended claims.

What is claimed is:

1. In a manual transmission of such a type that when a reverse idler gear mounted on a reverse idler shaft which is fixed on a transmission casing is shifted by a reverse shifting operation, a clutch hub sleeve of a synchromesh unit for a forward speed gear, which unit is mounted on a counter shaft and is adapted to rotate with said counter shaft, said counter shaft being parallel to said reverse idler shaft and rotatably mounted on said transmission casing, is moved in a reverse direction relative to a forward speed geared position through an annular groove formed on said clutch hub sleeve and a shift fork adapted to engage with said annular groove; a shift mechanism comprising an arm rotatably mounted on said shift fork, one end of said arm being formed as a frictional portion adapted to contact with a bottom surface of said annular groove, a cam surface formed on a predetermined element of said transmission and having a projection, and means for applying rotational moment to said arm so as to urge the other end of said arm against said cam surface at all times, said arm being rotated to urge said frictional portion against the bottom surface of said annular groove when the other end of said arm passes over said projection of said cam surface during movement of said clutch hub sleeve in a reverse direction relative to the forward speed geared position.

2. The shift mechanism as defined in claim 1, wherein the other end of said arm serves as a cylindrical holder accommodating a pin and a coil spring therein, one end of said pin projecting from said holder and urging against said cam surface at all times by a biasing force of said coil spring applied to the other end of said pin.

3. The shift mechanism as defined in claim 1, wherein said shift fork has a projected portion and said arm is rotatably mounted on said projected portion.

4. The shift mechanism as defined in claim 1, wherein said cam surface is formed on said reverse idler shaft.

5. The shift mechanism as defined in claim 4, wherein said projection of said cam surface is circularily formed on an outer circumferential surface of said reverse idler shaft.

6. The shift mechanism as defined in claim 1, wherein said rotational moment applying means is a spring, one end of said spring being fitted on said arm, the other end of said spring being fitted on said shift fork.

7. The shift mechanism as defined in claim 1, wherein said frictional portion of said arm extends along the length of said annular groove of said clutch hub sleeve.

* * * * *